United States Patent [19]

Filreis et al.

[11] 3,879,249

[45] Apr. 22, 1975

[54] CABLE ENCLOSURE

[75] Inventors: Manuel Filreis, Edina; Aelred D. Driscoll, North St. Paul, both of Minn.

[73] Assignee: Minnesota Mining and Manufacturing Company, St. Paul, Minn.

[22] Filed: May 8, 1974

[21] Appl. No.: 468,203

Related U.S. Application Data

[63] Continuation of Ser. No. 228,031, Feb. 22, 1972, abandoned.

[52] U.S. Cl. .................. 156/215; 156/48; 156/49; 156/257; 161/123; 174/76; 264/316; 264/DIG. 44
[51] Int. Cl. ........................................... B29c 17/04
[58] Field of Search ........ 156/48, 49, 257, 212–215; 174/76, 84 R, 93, 21 R; 264/313, 316, DIG. 44; 161/121, 123

[56] References Cited
UNITED STATES PATENTS

| 2,622,276 | 12/1952 | Wilson | 264/DIG. 44 |
|---|---|---|---|
| 2,908,744 | 10/1959 | Bollmeier | 174/76 |
| 3,042,562 | 7/1962 | Peterson | 161/123 X |
| 3,161,210 | 12/1964 | Loof | 161/123 X |
| 3,419,669 | 12/1968 | Dienes | 174/76 X |
| 3,515,798 | 6/1970 | Sievert | 174/84 W X |

FOREIGN PATENTS OR APPLICATIONS

| 614,477 | 12/1948 | United Kingdom | 174/21 R |

*Primary Examiner*—Charles E. Van Horn
*Assistant Examiner*—David A. Simmons
*Attorney, Agent, or Firm*—Alexander, Sell, Steldt & DeLaHunt

[57] ABSTRACT

A stiff resilient segmented polymeric plastic sheet useful for forming an enclosure about a cable splice or termination. The sheet is grooved to reduce its thickness along narrow linear intersecting latticed strips which define rectangular and triangular patterns in the sheet. The sheet can be easily cut and folded along the narrow strips to form hollow enclosures of various sizes and shapes.

1 Claim, 9 Drawing Figures

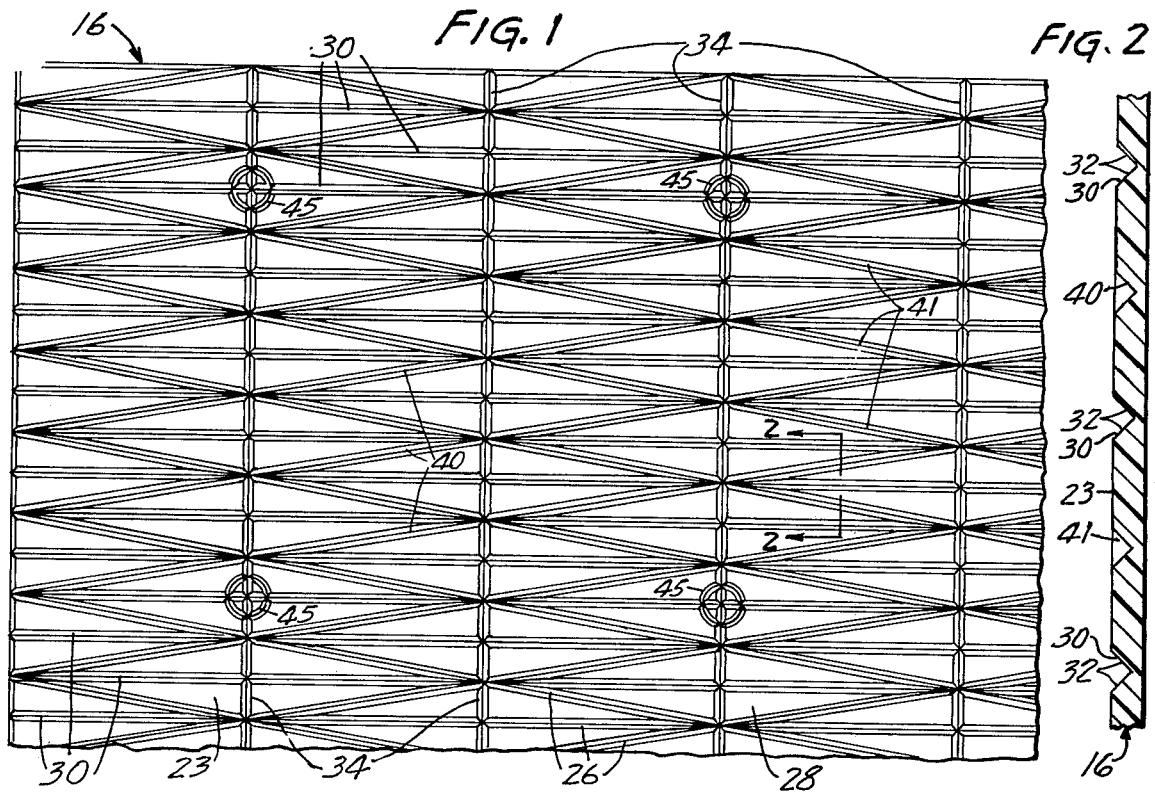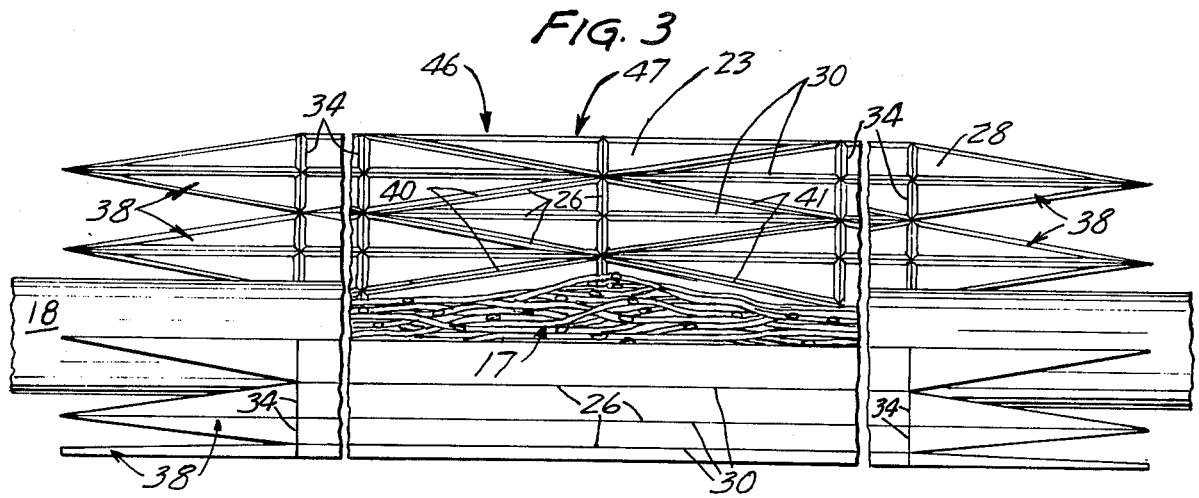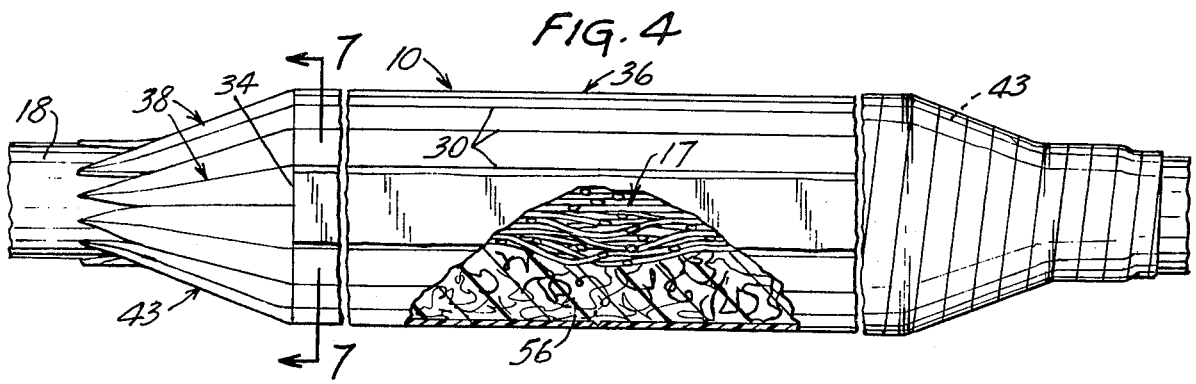

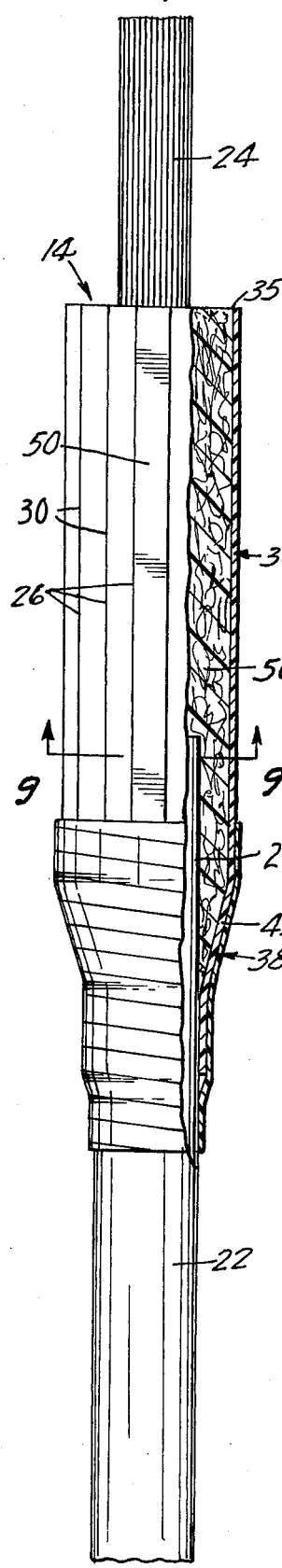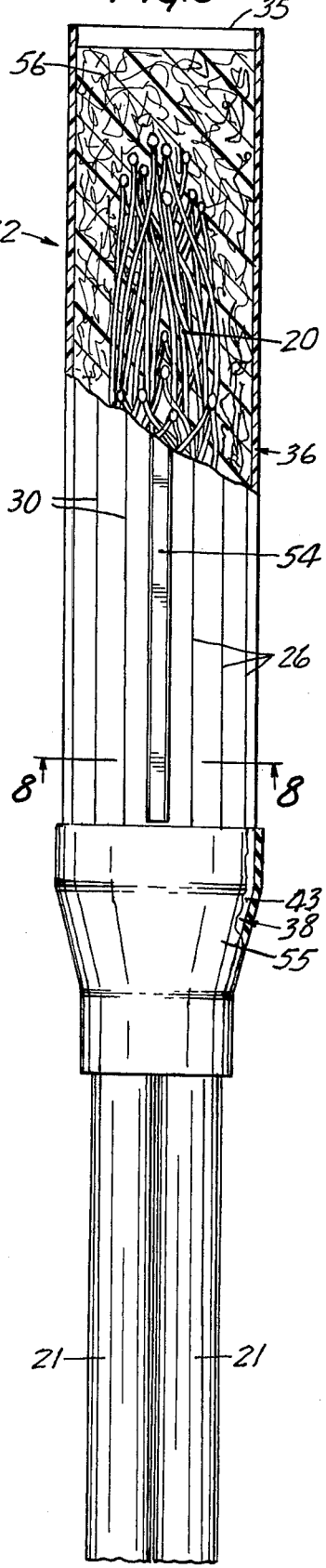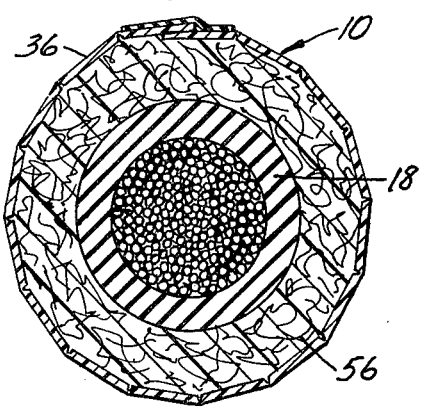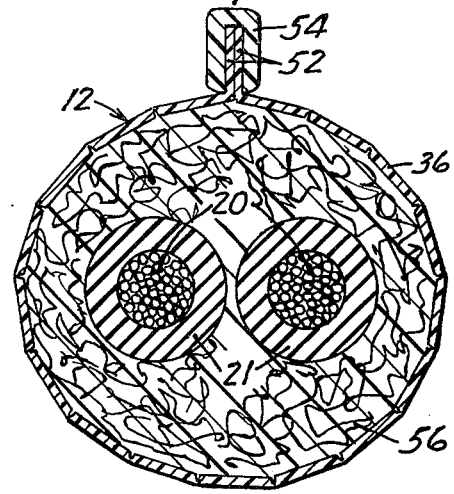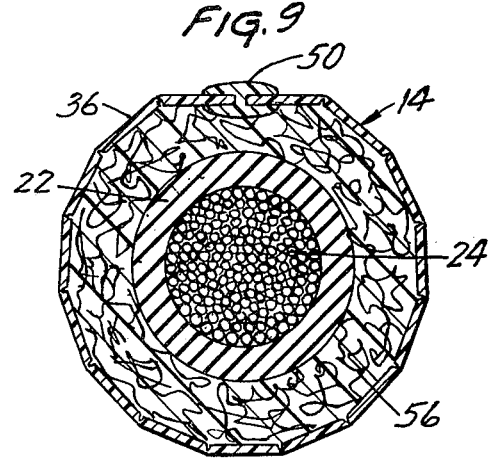

CABLE ENCLOSURE

This is a continuation of application Ser. No. 228,031, filed Feb. 22, 1972, now abandoned.

FIELD OF THE INVENTION

This invention relates generally to the splicing and terminating of electric cables, and in one important aspect to closures formed around a splice or termination in a communication or power cable. The invention includes a novel sheet material for forming a protective enclosure or mold about a splice or cable termination, a method of applying the sheet material, and the novel enclosures prepared thereby.

DESCRIPTION OF THE PRIOR ART

A splice or termination in a power or communication cable is conventionally protected by the use of an enclosure which forms a mold for an insulating self-curing resinous composition applied in liquid form around the splice or termination. Prior art configurations for molds for this purpose include the preformed rigid molds of the type shown in U.S. Pat. Nos. 2,862,042 and 2,908,744. These molds have a desirable rigidity so that they will maintain their shape prior to curing of the resinous composition. However, the fixed diameter and length of an individual mold according to one of these patents requires that a large variety of sizes of such molds must be stocked and accessible to workmen to ensure the availability of a mold suitable for any splice or termination which may be encountered. An individual mold of the type described in U.S. Pat. Nos. 2,967,795 and 3,419,669 provides better adaptability to the sizes of splices or terminations encountered by workmen. However, use of the mold of U.S. Pat. No. 2,967,795 requires careful and extensive hand labor, and the flexibility of a mold according to either of these patents may allow undesirable uneven distribution of the insulating resinous composition around the splice or termination if proper external support is not provided prior to the curing of the insulating resin.

SUMMARY OF THE INVENTION

The present invention provides a number of improvements over these prior art structures and procedures. There is provided a stiff resilient polymeric plastic sheet having grooves on at least one surface forming several intersecting latticed sets of spaced parallel linear narrow strips of reduced sheet thickness which define rectangular and triangular patterns in the sheet. The sheet may be easily severed along the strips of reduced sheet thickness to form a sheet section of a desired size and shape. The sheet section can be shaped to form a closure or mold about a cable termination or splice by deforming the sheet along certain of the strips of reduced thickness, and by fastening the sheet section to itself and to a cable as by tape. The closure itself may provide protection for the termination or splice, or may serve as a mold to shape insulating self-curing resinous compositions applied in liquid form about the splice or termination. Access to a single sheet according to the present invention allows the workman to form an enclosure around virtually any normally encountered splice or termination. The rectangular and triangular patterns in the sheet afford versatility in the size and shape of a mold substantially equal that of the mold disclosed in U.S. Pat. No. 2,967,795, while an enclosure formed from a sheet according to the present invention has a rigidity approximating that of the plastic closures of U.S. Pat. Nos. 2,908,744 and 2,862,042, and may be used to mold pressure injected insulating resin with proper external tape reinforcing.

BRIEF DESCRIPTION OF THE DRAWING

The invention may be more readily understood by reference to the drawing in which:

FIG. 1 is a fragmentary view of a sheet for forming a protective enclosure according to the present invention;

FIG. 2 is an enlarged fragmentary cross sectional view taken approximately along the lines 2—2 of FIG. 1;

FIG. 3 illustrates a sheet section for use as an enclosure which has been severed from a sheet according to the present invention and is partially formed around a cable splice;

FIG. 4 is a horizontal plan view, partially in section, of the sheet section illustrated in FIG. 3 shaped as an enclosure about the cable splice, with one end of the enclosure taped to the cable;

FIG. 5 is a side elevational view partially in section, of an enclosure formed from a sheet according to the present invention and positioned around a pair of vertically extending spliced cables to form an open ended mold for a self-curing insulating resinous composition around the splice;

FIG. 6 is a side elevational view partially in section, of an enclosure formed from a sheet according to the present invention and positioned around a vertically extending communication cable to form an open ended mold for a self-curing resinous composition sealing the termination of the cable sheath;

FIG. 7 is a cross sectional view taken approximately along the lines 7—7 of FIG. 4;

FIG. 8 is a cross sectional view taken approximately along the lines 8—8 of FIG. 5; and FIG. 9 is a cross sectional view taken approximately along the lines 9—9 of FIG. 6.

DESCRIPTION OF THE PREFERRED EMBODIMENT

Referring now to FIGS. 4, 5 and 6 there are illustrated a series of enclosures 10, 12 and 14 formed from a sheet 16 (FIG. 1) according to the present invention, and which have served as molds to shape an insulating self-curing epoxy or polyurethane resinous composition applied as a liquid about the cables. The enclosure 10 of FIG. 4 is formed about a running splice 17 in a communication cable 18, while the enclosure 12 of FIG. 5 is formed about a splice 20 between a pair of co-extending cable ends 21. The enclosure 14 of FIG. 6 molds the resinous composition to form a seal at the end of the shield on a communication cable 22 so that the insulated conductors 24 of the cable 22 pass through the seal, while the seal prevents the escape of air under pressure within the shield of the cable 22.

The sheet 16 according to the present invention is formed of a stiff resilient polymer material such as polyvinyl chloride, polyethylene, polyvinyl butyrate, polycarbonate, polystyrene, polyester, ABS copolymers, epoxy, acrylic, or nylon, a preferred material being polypropylene in view of the excellent flexing qualities afforded by thin sections thereof. The sheet 16 has a major thickness preferably in the range of 0.040 to 0.100 inch with a preferred thickness of 0.060 inch. One surface 23 of the sheet 16 is grooved to reduce the thickness of the sheet 16 to no greater than 0.030 inch (preferably 0.015 inch) along narrow linear intersecting latticed strips 26 (herein called strips). These strips 26 define rectangular and triangular patterns in the sheet 16, each of which patterns is comprised of one or more right tirangular sheet segment 28. The stiff resilient sheet 16 may be easily severed along the strips 26 of sheet material at the bases of the grooves as by a shears or pocket knife to cut away unwanted sections of the sheet 16 and form a sheet section of a desired configuration for use as an enclosure. Each of the triangular sheet segments 28 is relatively small and the rectangular and triangular patterns in which they are arrayed afford relatively precise tailoring of a sheet section for a required configuration to form an enclosure about a cable splice or termination. The sheet section may then be shaped by applying sufficient pressure to the sheet section so that it will bend along certain of the thin narrow strips 26 by deformation of the sheet material at the base of the grooves. The strips 26 will deform without rupturing to allow the sheet 16 to be shaped into an enclosure about a splice or termination. The enclosure may have planar walls and/or walls approximating an arc comprised of a series of adjacent flat sheet portions disposed at an angle to each other by deformation of their connecting strips 26.

The thin narrow intersecting strips 26 of sheet material formed by grooves in the sheet 16 include a first set 30 of equally spaced parallel longitudinally extending thin narrow strips 26, preferably spaced at one-half inch intervals. One or more of the strips 26 of the first set 30 may be severed to establish the width of a sheet section to be used as an enclosure. The first set of strips 30 will deform to allow a sheet section to be shaped around a cable termination or splice on four sides as by shaping a generally cylindrical enclosure. The sheet section is preferably shaped with the surface 23 in which the grooves are formed as an inner surface to present a smooth outer surface for the enclosure, and so that the maximum deformation of each narrow strip 26 may be limited by contact between the walls 32 defining the groove as will later be explained.

The thin narrow intersecting strips 26 of sheet material also include a second set 34 of equally spaced parallel strips (spaced preferably on 3 inch centers) which intersect the strips 26 of the first set 30 and are perpendicular thereto to define rectangular patterns in the sheet 16. One or more of the strips 26 of the second set 34 may be severed to establish the length of a sheet section where, as in the enclosures illustrated in FIGS. 5 and 6, an open end 35 is formed on a cylindrical portion 36 of an enclosure to receive a self-curing liquid resinous compound. Shaping an enclosure may deform certain strips of the second set 34 as when triangular sections or projections 38 on a generally cylindrical portion of an enclosure (formed by severing the sheet along strips 26 later to be explained) are moved into contact with the surface of a cable as has been done on the enclosures illustrated in FIGS. 4, 5, and 6.

The thin narrow intersecting latticed strips 26 of sheet material formed by grooving the sheet 16 also include a third set 40 and a fourth set 41 of equally spaced parallel linear thin narrow strips 26. The strips 26 of the third and fourth sets 40 and 41 are similarly spaced and intersect each other and the strips of the first set 30 and the second set 34 at the intersections between the first and second sets 30 and 34. The first, second, third and fourth sets of strips 30, 34, 40, and 41 define triangular patterns within and crossing the rectangular patterns defined by the first and second sets of strips 30 and 34. Intersecting strips 26 of the third and fourth sets 40 and 41 may be partially severed to form the adjacent sheet sections 38 each in the shape of an isosceles triangle having their bases attached at the ends of the cylindrical portions 36 of the closures illustrated in FIGS. 4, 5 and 6. Triangular sheet sections may be cut to different heights and corresponding widths to accommodate cylidrical sections of various diameters. The ends of the triangular sections 38 may be deflected inwardly to contact and be attached to the jacket of a cable (FIG. 4) as by taping to afford a smooth fitting truncated generally conical transition wall 43 between a cylindrical portion 36 of an enclosure and the periphery of a cable (FIGS. 4, 5 and 6).

The sheet 16 illustrated in FIG. 1 is also grooved in a repetitive series of circular patterns around intersections between strips 26 of the first and second sets 30 and 34 to form thin narrow annular strips 45. These annular strips 45 may be easily severed to afford removal of a corresponding circular section of sheet material and provide an opening through which the liquid insulating self-curing resinous compound may be introduced, as by a funnel, into an enclosure serving as a mold.

The grooves defining the thin narrow strips 26 may have various cross-sectional shapes, including a U or V shape. The grooves may be machined or hot pressed into the sheet 16. Preferably the grooves are generally V shaped as illustrated in FIG. 2, and are defined by planar edge walls 32 on the sheet segments 28 which converge toward the base of each groove which may be slightly radiused. Preferably the edge walls 32 are disposed at a 90° angle to each other when the sheet 16 is planar. Contact of the edge walls 32 will limit deformation of the strip 26 at their base. Thus, the angle between the walls 32 of grooves for at least the first set of strips 30 could be decreased as an aid in causing more equal deformation of the strips 26 to form a generally cylindrical enclosure portion 36 with some loss of versatility for the sheet 16.

The general method for forming enclosures such as those illustrated in FIGS. 4, 5, and 6 will not be explained with particular reference to the enclosure 10 illustrated in FIG. 4.

The workman determines the size and shape of an enclosure to be formed. From a sheet 16 of sufficient size to form the enclosure (or from a series of sheets joined at their edges as by tape), the workman removes the unwanted portion of the sheet 16 to form a sheet section of a predetermined configuration for forming the enclosure. This is conveniently done by cutting along certain of the linear strips 26 with a shears or pocket knife. To form an enclosure to fit about the running splice 17 illustrated in FIGS. 3 and 4, a sheet section 46 would be formed (as illustrated in FIG. 3) having a rectangular central section 47, and a row of the triangular sections 38 having their bases attached along each end of the central section 47. The sheet section is then shaped around the cable to form the enclosure by deforming the sheet material along certain of the narrow strips 26. The sheet section 46 illustrated in FIG. 3 will be shaped around the cable 18 into the enclosure 10 illustrated in FIG. 4 by applying pressure to the sheet section 46 to equally deform strips 26 of the first set 30 and shape the generally cylindrical enclosure portion 36 from the rectangular central section 47. The triangular sections 38 are then pressed toward the cable 18 to deform the strips 26 of the second set 34 which join the triangular sections 38 to the cylindrical portion 36 and bring the ends of the triangular sections 38 into contact with the cable 18.

The sheet section is attached to itself and to the cable to retain its shape and location by attaching means which may include taping. The edges of the rectangular section may be attached by being lapped and taped together as illustrated in FIGS. 4 and 7, or by being pressed into opposing tight fitting grooves on a joining strip 50 as illustrated in FIGS. 6 and 9. As shown in FIG. 4, attaching the edges of the rectangular section may also be done by providing longitudinal rectangular sheet portion 52 at the edges of the rectangular section which may be turned radially outwardly of the cylindrical enclosure portion 36 to serve as lips 52 which may be clipped together as by a frictional grooved clip 54 (FIGS. 5 and 8) or serve as guides between which a funnel may be inserted in a mold with closed ends to add liquid self-curing resinous compound. The triangular sections 38 may be attached by manually pressing them into contact with the cable 18 to deflect their ends until their edges adjoin (left end of FIG. 4 as illustrated). The generally truncated conical enclosure wall 43 thus formed is then wrapped with tape to retain its position and shape (right end of FIG. 4 as illustrated). Alternatively a tight fitting elastic preformed cap 55 (FIG. 5) could be pressed over the triangular sections to maintain them in position against the cable.

The seal between the ends of the triangular sections 38 and the surface of a cable may be facilitated by wrapping a strip of vinyl mastic material such as commercially available "B sealing tape" about the cable so that the ends of the triangular projections 38 are pressed into the vinyl mastic.

When an enclosure is used for a mold to encapsulate a splice or joint, the wires and connectors may be spaced from the walls of the enclosure by a mat 56 of open porous crush-resistant material having a high void volume (FIGS. 4, 5, 6, 7, 8 and 9). The liquid self-curing resin composition will fill the void areas and bond to the mat 56 thus insuring a layer of the cured resin composition between the wires and connectors and the enclosure wall so that moisture subsequently entering between the enclosure and the encapsulating material cannot contact a wire or connector to result in a short circuit or other difficulty. Particularly effective is a randomly woven mat 56 comprising continuous filaments of cellulose acetate butyrate, having a diameter of preferably between 0.013 and 0.022 inch.

While the enclosures illustrated in FIGS. 4, 5 and 6 all have one generally cylindrical section with a generally truncated conical section on at least one end for joining the cylindrical section to a cable, closures having sections of other configurations such as parallelepiped or wedge shaped may be easily formed with a sheet 16 according to the present invention.

Having thus described the present invention, what is claimed is:

1. A method performed by a workman at a splice or termination along a cable for forming an enclosure of a desired size and shape about the splice or termination from a stiff, resilient, polymeric sheet grooved on at least one surface to reduce its thickness and define intersecting latticed sets of spaced parallel narrow strips connecting segments of the sheet including a first longitudinally extending set; a second set perpendicular to and intersecting the first set to define a rectangular pattern; and third and fourth sets oblique to each other, intersecting at the intersections of the first and second sets, and extending diagonally of the rectangular pattern so that the shape of each segment is triangular; said method comprising the steps of:

cutting said sheet along a strip of the first set spaced to provide a remaining sheet section having edges and a width between the edges measured along the second set of strips adapted to extend around the splice or termination;

cutting the sheet along strips of the third and fourth set to provide, on at least one end of the sheet section, adjacent triangular projections projecting from a common strip of the second set;

bending the strips of the first set to shape the sheet section into a generally cylindrical enclosure around the splice or termination with said edges of the sheet section in contact;

attaching together said contacting edges of the sheet section by applying an overlapping layer of tape of a joining strip adapted to frictionally receive and retain the contacting edges;

pressing the triangular projections toward the cable to bend the strip of the second set from which the triangular segments project until the tips of the triangular projections are deflected against the cable and their edges are closely adjacent; and wrapping tape around the triangular projections to attach them together and to the cable.

* * * * *

UNITED STATES PATENT OFFICE
CERTIFICATE OF CORRECTION

PATENT NO. : 3,879,249

DATED : April 22, 1975

INVENTOR(S) : Manuel Filreis and Aelred D. Driscoll

It is certified that error appears in the above-identified patent and that said Letters Patent are hereby corrected as shown below:

Column 4, line 13, change "cylidrical" to -- cylindrical --; and line 47, change "nct" to -- now --.

Column 6 (claim 1, line 41,) change "of" (second occurrence) to -- or --.

Signed and Sealed this twenty-second Day of July 1975

[SEAL]

Attest:

RUTH C. MASON
Attesting Officer

C. MARSHALL DANN
Commissioner of Patents and Trademarks